(12) United States Patent
Müller

(10) Patent No.: US 6,631,943 B2
(45) Date of Patent: Oct. 14, 2003

(54) SLIDING ROOF FOR MOTOR VEHICLES

(76) Inventor: Hermann-Frank Müller, Lyngsbergstr. 3a, Bonn (DE), D-53177

( * ) Notice: Subject to any disclaimer, the term of this patent is extended or adjusted under 35 U.S.C. 154(b) by 0 days.

(21) Appl. No.: 10/057,060

(22) Filed: Jan. 25, 2002

(65) Prior Publication Data

US 2002/0101097 A1 Aug. 1, 2002

(30) Foreign Application Priority Data

Jan. 26, 2001 (DE) .......................................... 101 03 693
Feb. 19, 2001 (DE) .......................................... 101 07 999

(51) Int. Cl.⁷ .................................................. B60J 7/04
(52) U.S. Cl. ...................................................... 296/211
(58) Field of Search ..................... 296/2.11; 136/244, 136/251, 291

(56) References Cited

U.S. PATENT DOCUMENTS

| 5,076,634 | A |   | 12/1991 | Müller et al. |
| 5,578,877 | A |   | 11/1996 | Tiemann |
| 6,074,692 | A | * | 6/2000 | Hulett .................. 427/115 |
| 6,104,597 | A |   | 8/2000 | Konushi et al. |
| 6,318,798 | B1 |   | 11/2001 | Bergmiller |
| 6,331,031 | B1 |   | 12/2001 | Patz et al. |
| 6,346,340 | B1 |   | 2/2002 | Abersfelder et al. |

FOREIGN PATENT DOCUMENTS

| DE | 3713854 | * | 10/1987 | .................. 296/211 |
| DE | 40 06 756 |   | 9/1991 | |
| DE | 196 47 031 |   | 11/1995 | |
| DE | 196 02 203 |   | 7/1997 | |
| DE | 197 37 286 |   | 3/1999 | |
| DE | 199 07 333 |   | 5/2000 | |
| DE | 198 50 296 |   | 6/2000 | |
| DE | 199 07 232 |   | 9/2000 | |
| DE | 199 14 661 |   | 10/2000 | |
| JP | 2001095166 A | * | 4/2001 | |
| JP | 2001135339 A | * | 5/2001 | |

* cited by examiner

Primary Examiner—Dennis H. Pedder
(74) Attorney, Agent, or Firm—Gudrun E. Huckett

(57) ABSTRACT

A sliding roof for a roof opening in a vehicle has a light-transparent cover and solar modules arranged on the cover for energy generation, wherein the solar modules are light-transmissive. At least one auxiliary energy generator is provided on the sliding roof and operates independently of a motor of the vehicle. At least one additional energy storage device is arranged in direct vicinity of the solar modules.

11 Claims, 6 Drawing Sheets

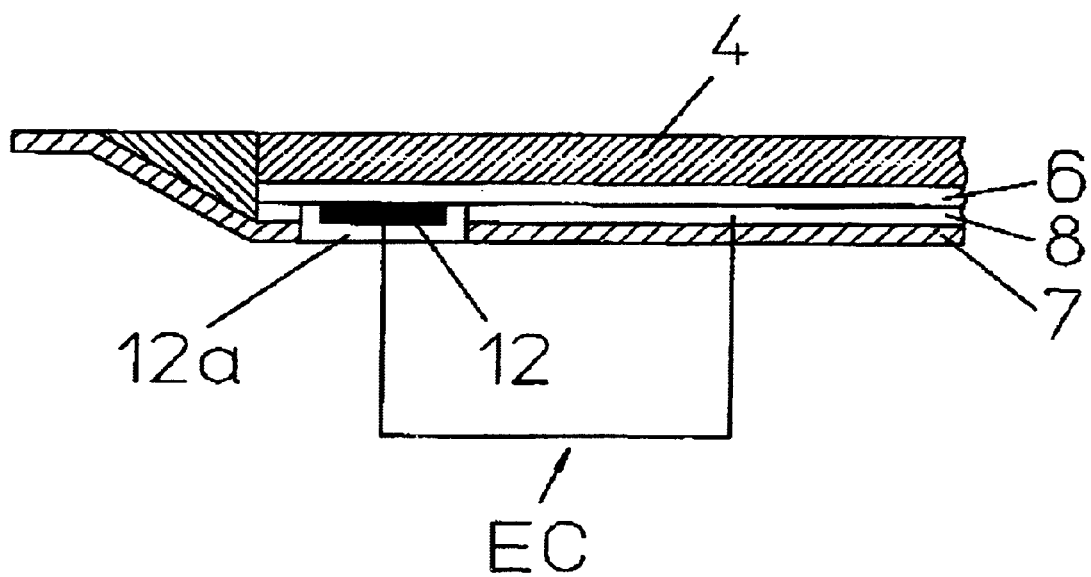

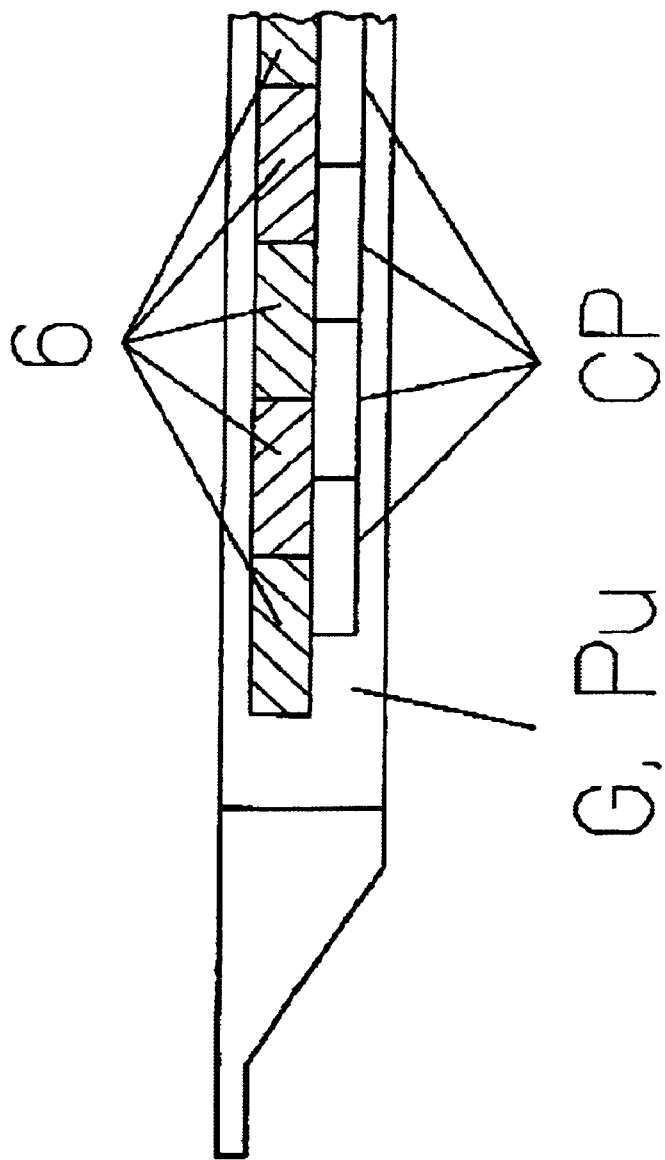

SLIDING ROOF FOR MOTOR VEHICLES

BACKGROUND OF THE INVENTION

1. Field of the Invention

The invention relates to a sliding roof comprising a light-transparent or light permeable cover for a roof opening in a vehicle of any configuration.

2. Description of the Related Art

Such sliding roofs are described, for example, in German patent 199 11 811 C1. The cover preferably comprises a cover plate in the form of a transparent pane of glass 12 having a solar cell arrangement 14 attached by means of an adhesive foil 16 to its underside.

From German patent 199 37 221 C1 a sliding roof is known having a closure element 14 comprised of a main solar generator 24 and an auxiliary solar generator 34 of the same kind, wherein the auxiliary solar generator 34 is arranged underneath the main solar generator 24 and can be moved out of this position in order to increase the power generated by solar energy.

From German patent 199 07 232 C1, moreover, a sliding roof is known from where the electrical energy generated by the solar cells is supplied to a ventilator motor for operating it or also to the vehicle battery so as to be stored therein (this is described in particular in column 2, lines 36 to 40, of this patent document).

SUMMARY OF THE INVENTION

It is an object of the present invention to improve the generation of electrical energy for supplying a larger number of consumers in order not to be dependent on the vehicle battery during peak energy consumption when the electrical energy generated by means of the solar cells is not sufficient.

In accordance with the present invention, this is achieved in that the solar modules are configured to be light-transparent, in that at least one auxiliary energy generator of a special configuration is provided on the sliding roof and is configured to operate independently of the vehicle motor, and in that at least one additional energy storage device is arranged in direct vicinity of the solar modules.

Accordingly, not only are the solar modules configured to be transparent so that they can convert light impinging from two sides into electrical energy and, as an added benefit, they allow the passage of light through the roof opening into the interior of the vehicle, but also at least one auxiliary energy generator of a special kind is provided which, in contrast to the conventional generator (alternator) of motor vehicles driven by the motor of the vehicle, is arranged on the sliding roof, operates independently of the vehicle motor, and thus ensures energy generation particularly for a large number of consumers such as air conditioning devices, electrical brakes, electrical vehicle heating in winter when the motor of the vehicle is switched off, recharging of the vehicle battery and the like, even when the generation of electrical energy by means of the solar cells, for example, in the case of inclement weather or at night, is reduced or even completely lacking. In this way, the fuel consumption when driving, for example, for operating the air conditioning of a vehicle by means of the vehicle battery, is also reduced. By arranging at least one energy storage device in direct vicinity of the solar modules on the sliding roof, the energy-supplying lines between solar modules and energy storage device as well as between the auxiliary energy generator on the sliding roof and the energy storage device become particularly short.

BRIEF DESCRIPTION OF THE DRAWINGS

In the drawing:

FIG. 3a shows schematically the electrical connection EC between the energy storage and the auxiliary energy generator;

FIG. 3b shows the solar modules embedded together with their contact paths CP embedded in glass (G) or polyurethane (PU);

DESCRIPTION OF THE PREFERRED EMBODIMENTS

Figure 1:
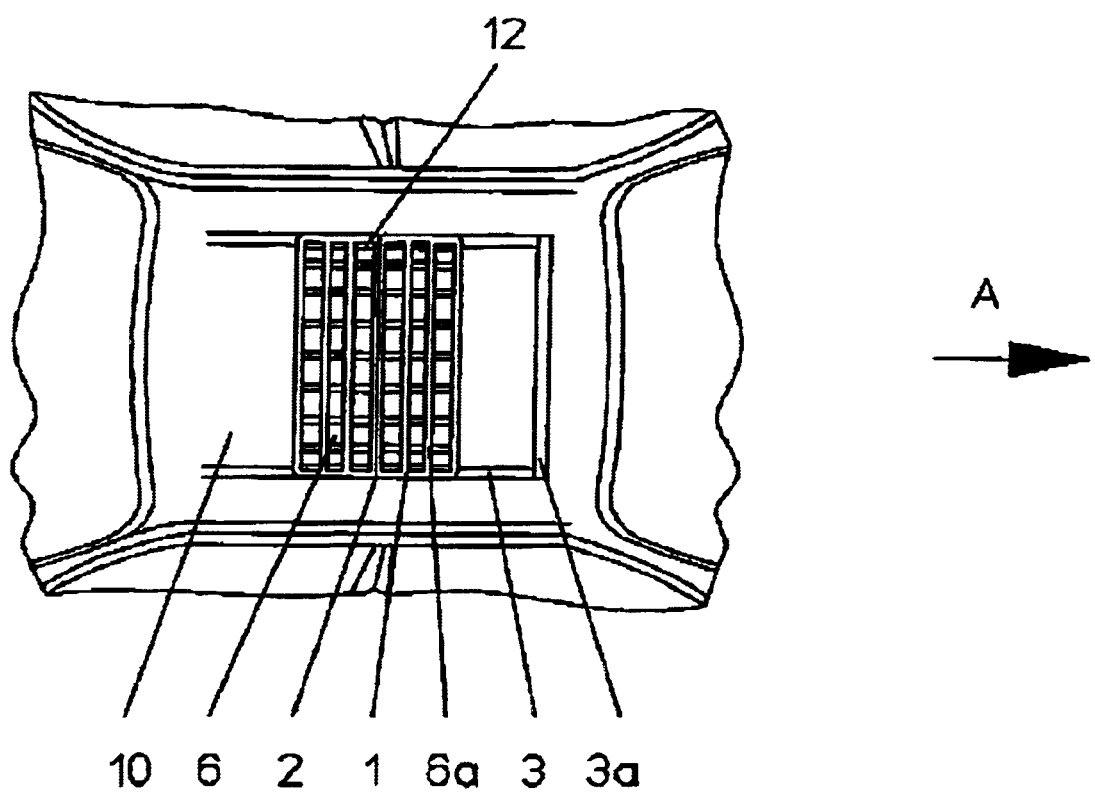
FIG. 1 is a plan view of a first sliding roof arrangement on a vehicle in the form of a passenger car.
Figure 3:
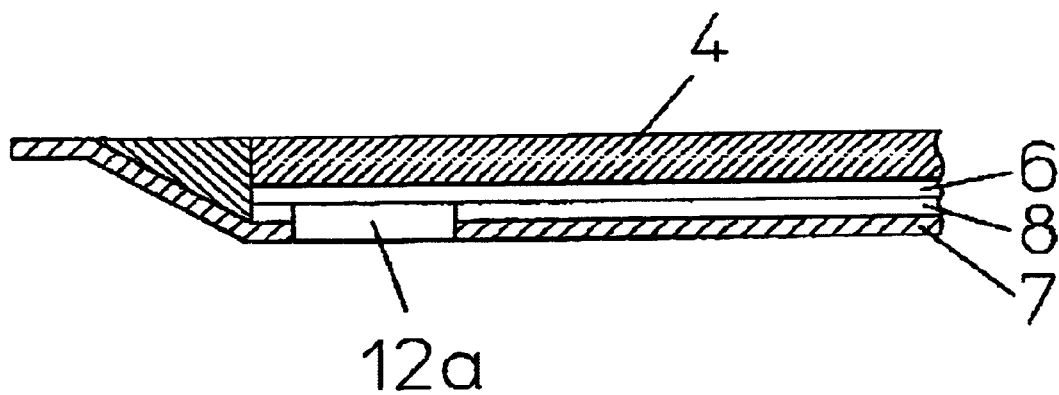
FIG. 3 shows a cross-section of the layers of the cover on an enlarged scale.

In a motor vehicle according to FIG. 1, a sliding roof 1 is provided which can be moved, for example, lifted, out of the opening 2 manually, electrically or the like in the upward direction and can be moved in the guides 3 to the front or to the back or with a first part to the front and a second part to the back (see FIG. 1) so that air can reach the interior of the vehicle. The guides 3 end in the driving direction A in the stop strip 3a which in the driving direction A is slanted relative to the vehicle roof in order to keep the air resistance of the vehicle when driving as low as possible. A corresponding stop strip is not necessarily required for the guides in the direction counter to the driving direction, in particular, when these guides have a stop for the corresponding sliding roof part. Within this sliding roof 1 solar modules 6 of monocrystalline and/or polycrystalline solar cells are arranged, in particular, thin-film photovoltaic (PV) elements, for example, made of thin-film amorphous silicon, copper-indium-diselenide, cadmium telluride, gallium arsenide, crystalline silicon. They are covered by a light-permeable or transparent cover 4, as illustrated in FIG. 3. This cover 4 can be made of glass, of recyclable polyurethane elastomer with very good mechanical properties, such as good wear resistance and good damping and restoring behavior, of polycarbonate or of another material which is light-permeable and has the required strength values. For the manufacturing method and for assembly purposes it is also advantageous when the solar modules 6 are embedded together with the contact paths (not illustrated) connecting them in the same light-permeable material of the cover 4, for example, by casting, in particular, because in this way leaks are automatically prevented and because they can in this way form a constructive unit with the cover, even if they are only connected by an adhesive to one another.

When the solar modules 6 and their contact paths are also light permeable, as is known in the art, they can be embedded (for example, by casting) together in the cover 4, as described above, the cover 4 being made, for example, of glass, polyurethane elastomer or the like, or the electrical connections (contact paths of any kind, possibly also embodied as a wire harness) to the energy storage devices 8 can be arranged between primarily also light-transparent spacers. In this area, it is also possible to provide, if needed, energy consuming devices such as lamps (LEDs and/or PLEDs) because, in this case, they can be replaced, if required. The light-transparent solar modules 6 then not only can receive light from two sides and can thus improve their output, but they also allow passage of light into the interior of the vehicle when the sliding roof has not been removed from the roof opening 2.

A person skilled in the art can easily decide whether the solar modules, matched to the shape of the vehicle roof 10, should be arranged in the sliding roof 1 or—if the thickness of the vehicle roof 10 allows for it—arranged in the form of lamellas with a fixed or adjustable angle relative to the roof shape, wherein the adjustment of the angle can be controlled manually or automatically, but also temporally (compare in this connection the prior art German patent 199 07 333 C1) in order to improve the output of the solar modules 6 in that the light can reach them form two sides, even when the sliding roof 1 has been lifted out of the opening 2 and has been completely moved onto the light-impermeable vehicle roof 10. Of course, in this case it is also possible to divide the sliding roof 1 so that one part is moved from the opening 2 to the front and the other part to the rear (see also German patent 199 07 333 C1).

Another possibility of providing solar cells is to apply a coating on the cover 4. This can be realized, for example, in the case of CIS thin films (copper-indium-selenium) by means of an ion beam (see German patent application 199 02 908 A1). This process can be applied to glass substrates as well as flexible and light-weight substrates such as metal-coated plastic foils.

The solar modules 6 are arranged in the sliding roof 1, for example, in rows. Between the individual rows or on them, below them, or on their edges or frame part 6a the correlated energy storage devices 8 (see FIGS. 3 and 1) are arranged, advantageously in the form of thin layer elements which can also be light-transmissive (transparent), as is known from U.S. Pat. No. 6,104,597. The thin-layer elements 8 can be arranged on a support material 7 of the cover 4 and/or on the frame part 6a of the solar modules. A person skilled in the art can easily determine for a given application whether these energy storage devices 8 should be in the form of an accumulator (battery) or a high performance capacitor.

Figure 4:
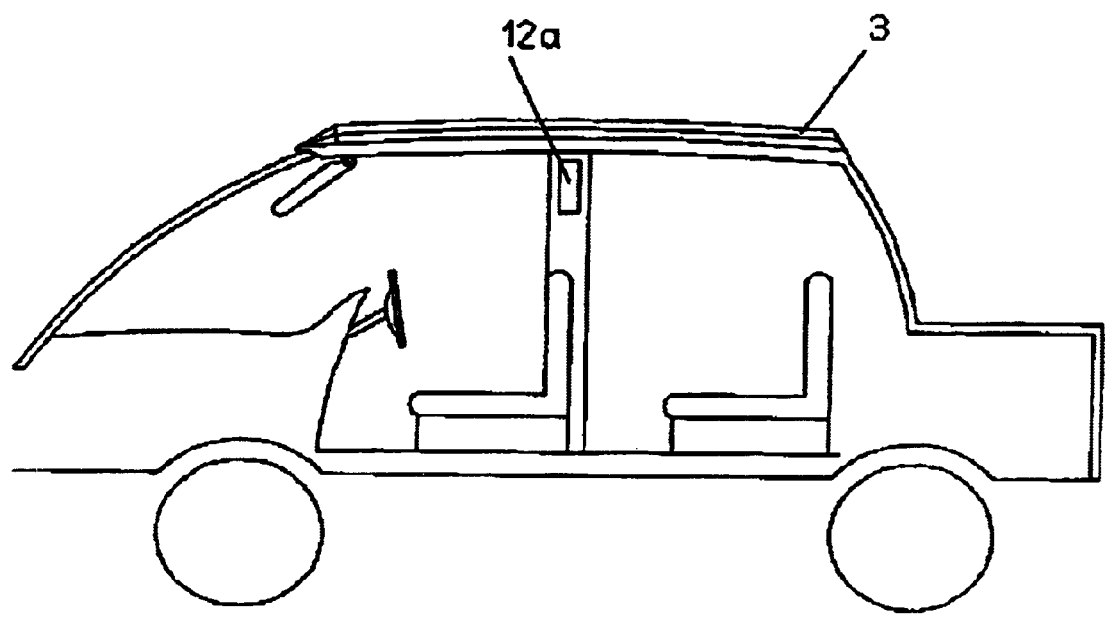
FIG. 4 is a section of the vehicle showing a B column in which a housing for receiving a membrane fuel cell and at least one hydrogen cartridge is provided.

In addition to the energy storage devices 8 on the edge of the sliding roof 1 strip-shaped polymer electrolyte fuel cells and hydrogen cartridges are provided as an auxiliary energy generator or supply, preferably in their own housing 12a width a snap-on lid in order to be able to replace the hydrogen cartridge when spent. In this connection it is advantageous when several hydrogen cartridges can be positioned in the housing 12a which, similar to the action of a repeating rifle, can be moved sequentially in a controlled fashion to the polymer electrolyte fuel cell. This arrangement is particularly beneficial because of the short line connection to the energy storage devices 8 of the solar modules 6 which can thus store the electrical energy gained in this auxiliary way, if necessary. The housing 12a for the strip-shaped polymer electrolyte fuel cell with correlated hydrogen cartridge 12 can also be arranged in hollow spaces of the inner covering of the vehicle, for example, in the A, B, C columns (see FIG. 4). Even though in this situation the line connections or distances to the storage elements 8 on the sliding roof 1 in the area of the solar modules 6 are longer, the amount of gained energy however is significant.

Further generally known possibilities of providing additional energy and to convert it into electrical energy are based on using, in addition to brake energy, shock absorber energy (see German patent document 196 47 031 A1), the vibration energy (see German patent document 195 20 521 A1) and sound energy (see German patent document 196 02 203 A1). The energy gained in this way can be supplied also, individually or together, to the energy storage devices 8 on the sliding roof 1 from where they are then supplied to the different consuming devices. Since the sliding roof is arranged slidably or—as will be explained in the following—can be completely or partially removed from the vehicle roof 10, the electrical lines extending from the individual vehicle parts are to be arranged accordingly to be separable according to regulations before a connection to the energy storage devices 8 of the sliding roof 1 and/or an optionally temporary connection with the energy storage device connected to the vehicle motor is realized.

There is the possibility that the solar modules 6 themselves form the cover for the roof opening 2 wherein they are provided on the exterior with a known light-permeable and dirt-repellant layer against environmental or ambient effects such as moisture and temperature (see brochure of the company NOWOFOL & Kunststoffprodukte GmbH & Co. KG, 83313 Siegsdorf/Obb.). However, in order to prevent that these solar modules 6 are damaged when not operating, a protective cover (not shown) should be provided which is either slidably arranged or insertable into the roof opening 2 and which can be secured from the interior of the vehicle, in particular, mechanically, against removal. A constructive configuration of such as securing device is within the capabilities of a person skilled in the art and needs no further explanation in this context.

If it is desired to avoid light entering the interior through the sliding roof 1, this can be achieved by a curtain-like (not illustrated) sliding cover; however, it can also be configured as a manually or electrically actuatable, single-part or multi-part solid cover.

In order to be able to employ the electrical energy, generated by the solar modules 6 and the polymer electrolyte fuel cells with hydrogen cartridges 12 and stored in the storage elements 8, also outside of the vehicle at a more or less great distance to the vehicle, the cover 4 of the sliding roof 1 or the sliding roof itself has a separable locking mechanism, as is known in general from German patent 40 03 399 C2 in connection with a sun visor, wherein the special configuration of this locking mechanism depends on the given vehicle configuration and the desired design of the sliding roof.

Figure 2:
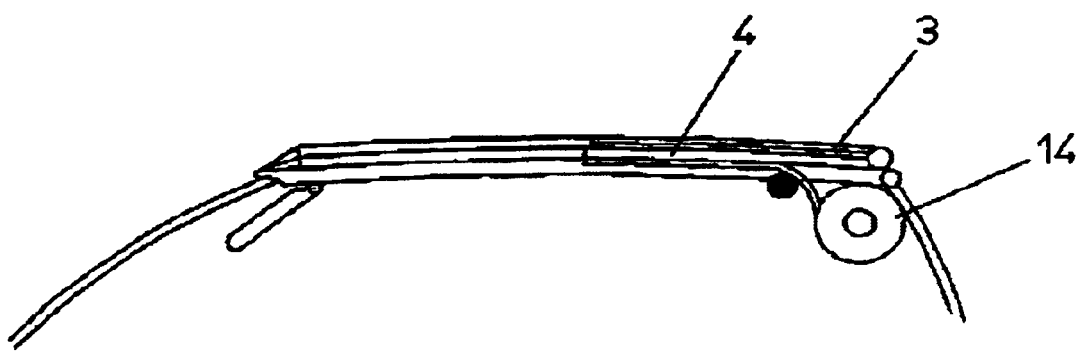
FIG. 2 is a schematic cross-sectional view of a second sliding roof arrangement on a motor vehicle.

There is furthermore the configurational possibility of embodying the sliding roof as a roll shade (see FIG. 2) and to arrange it within the vehicle on a roller 14 as is described in several variants in German patent application 198 50 296 A1. Such a roll shade can be made of foils coated with solar cells as described above. In order to be able to remove this sliding roof 1 also in this configuration from the vehicle, the actuating connections for the "shade" must be separated beforehand in the way known in the art.

Consumers for the electrical energy generated and stored on the sliding roof 1 which can be connected, for example, by plug connections on the sliding roof 1, are, for example, the air conditioning system of the vehicle, electric motors for ventilators, the electrical power drive for lifting and lowering windows, actuation of a "shade" of any kind and/or of the sliding roof 1, the adjustment of the exterior and interior mirrors, and similar functions on a vehicle. Of course, it is also possible to charge with this energy the motor vehicle battery or to operate the rear window defroster, an electrical cooler, and the like The above described sliding roof 1 can be employed in addition to their use in motor vehicles of the conventional kind such as trucks, passenger cars, vans, buses, also on railroad cars, ships, and electric vehicles of all kinds, for example, a golf cart. In this connection, it is up to the designer to decide whether in these cases the removal capability of the sliding roof 1 from the intended mounted position to a different location is expedient or should be omitted for cost reasons.

While specific embodiments of the invention have been shown and described in detail to illustrate the inventive principles, it will be understood that the invention may be embodied otherwise without departing from such principles.

What is claimed is:

1. A sliding roof for a roof opening in a vehicle, comprising a light-transparent cover (4) and solar modules (6) arranged on the cover (4) for energy generation, wherein the solar modules (6) are light-transmissive, wherein at least one auxiliary energy generator (12) is provided on the sliding roof (1) and operates independently of a motor of the vehicle, and wherein at least one additional energy storage device (8) is arranged in direct vicinity of the solar modules (6);

wherein the at least one energy generator is a strip-shaped polymer electrolyte fuel cell (12) with at least one correlated hydrogen cartridge arranged on at least one of a support material (7) of the cover (4) and a frame part (6*a*) of the solar modules (6), wherein the polymer electrolyte fuel cell (12) is connected electrically with the at least one energy storage device (8).

2. The sliding roof according to claim 1, wherein the auxiliary energy generator (12) is a strip-shaped polymer electrolyte fuel cell operated with hydrogen.

3. The sliding roof according to claim 1, wherein the at least one energy-storing device is a thin layer element (8) arranged at least on one of a support material (7) of the cover (4) and a frame part (6*a*) of the solar modules (6).

4. The sliding roof according to claim 3, wherein the thin layer element (8) is light-transmissive.

5. The sliding roof according to claim 1, wherein the polymer electrolyte fuel cell (12) with the at least one correlated hydrogen cartridge is arranged in a hollow space of the vehicle.

6. The sliding roof according to claim 1, wherein the solar modules (6) have contact paths connecting the solar modules (6), wherein the solar cells (6) and the contact paths are embedded in glass.

7. The sliding roof according to claim 1, wherein the cover (4) is comprised of polyurethane elastomer.

8. The sliding roof according to claim 7, wherein the solar modules (6) have contact paths connecting the solar modules (6), wherein the solar cells (6) and the contact paths are embedded in the polyurethane elastomer.

9. The sliding roof according to claim 1, wherein the sliding roof (1) is removable from the vehicle for use of the sliding roof (1) remote from the vehicle.

10. A sliding roof for a roof opening in a vehicle, comprising light-transparent solar modules (6) forming a cover of the sliding roof, wherein at least one auxiliary energy generator, in the form of a strip-shaped polymer electrolyte fuel cell (12) with at least one correlate hydrogen cartridge arranged on a support material (7) of the solar modules (6), wherein the polymer electrolyte fuel cell (12) is connected electrically with the at least one energy storage device (8), the generator is provided and operates independently of a motor of the vehicle, and wherein at least one additional energy storage device (8) is arranged in direct vicinity of the solar modules (6), wherein the solar cells (6) have a light transmissive, moisture-repellent and dirt-repellent protective layer.

11. The sliding roof according to claim 10, configured as a roll shade.

* * * * *